Figure 1:
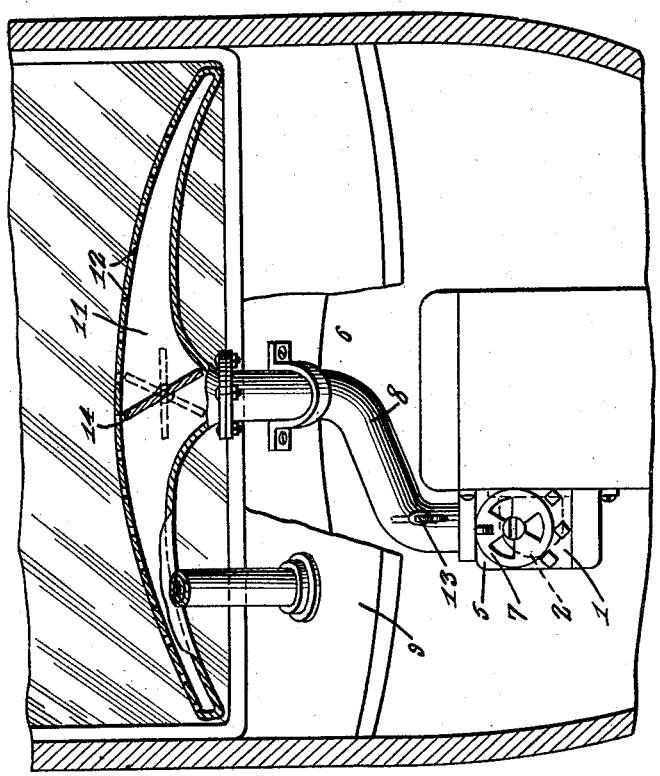

Aug. 19, 1930.  P. A. THORIN  1,773,650
NOZZLE FOR AUTOMOBILE HEATERS
Filed Nov. 17, 1928

P. A. Thorin, INVENTOR
BY Victor J. Evans
ATTORNEY

Patented Aug. 19, 1930

1,773,650

UNITED STATES PATENT OFFICE

PETER A. THORIN, OF IRON MOUNTAIN, MICHIGAN

NOZZLE FOR AUTOMOBILE HEATERS

Application filed November 17, 1928. Serial No. 320,193.

This invention relates to a nozzle which is especially adapted for use with automobile heaters, the general object of the invention being to provide a nozzle for distributing heated air over the entire part of the windshield, with valve means for preventing the air from reaching one-half or the other of the nozzle or for causing the air to pass to all parts of the nozzle.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawing wherein Figure 1 is a transverse sectional view through an automobile and through the nozzle, with the parts for conducting heated air to the nozzle shown in elevation.

In this view, the numeral 1 indicates a stove or casing suitably attached to the motor of the vehicle and surrounding the exhaust manifold 2 thereof, the front end of the casing being open, and this end is located adjacent the fan so that the air from the fan will be driven into the casing. The rear end of the casing has an elbow part 5 attached thereto, this part extending through a hole in the dash 6 and its rear end is formed with openings so that the heated air from the stove can escape into the interior of the vehicle. This flow of air through these holes is controlled by a rotary valve 7 attached to this end of the elbow.

A curved pipe 8 has its lower end connected with the elbow and said pipe extends upwardly through a hole formed in the instrument board 9 and its upper end is connected to a substantially fan-shaped member 11 at the center of said member, this member extending across the lower part of the windshield, as shown in Figure 2, and having perforations 12 in its upper edge so that the heated air passing through these perforations will pass upwardly along the inner surface of the windshield and thus act to prevent moisture and ice collecting on the windshield and to melt snow adhering to the windshield. A valve 13 is arranged in the pipe 8 for controlling the flow of heated air thereto and a valve 14 is arranged in the central part of the member 11 and can be adjusted to permit the air to pass into both parts of said member 11 or into either one part or the other, as shown in dotted lines in Figure 2.

From the foregoing it will be seen that pure air will flow into the stove or casing 1 and be heated by the exhaust manifold and if the valve 7 is open, this air will escape into the interior of the automobile and thus heat the same. Some of this air will pass through the pipe 8 into the member 11 and be directed against the windshield so as to prevent the collection of snow, ice or moisture on the windshield and as will be seen, the flow of air into the vehicle and to the member 11 can be regulated independently by the valves 7 and 13. The valve 14 can be adjusted to permit the air to flow into the entire part of the member 11 or into one-half or the other.

It will, of course, be understood that other pipes can be led to devices similar to the device 11 for preventing the formation of ice or moisture on the windows of the vehicle.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A device of the class described comprising a nozzle of substantially fan shape, with perforations in its outer edge, inlet means connected with the apex part of the nozzle and a butterfly valve in the nozzle having a stem at its center passing through the center of the nozzle, said valve closing the inner end of one-half of the nozzle when in one position, the inner end of the other half of the nozzle when in another position, and movable to a position where both halves of the nozzle are open to the inlet.

In testimony whereof I affix my signature.

PETER A. THORIN.